June 4, 1940. S. S. GREEN 2,203,411
PIVOT FOR WATT-HOUR DISKS AND THE LIKE
Filed March 1, 1937
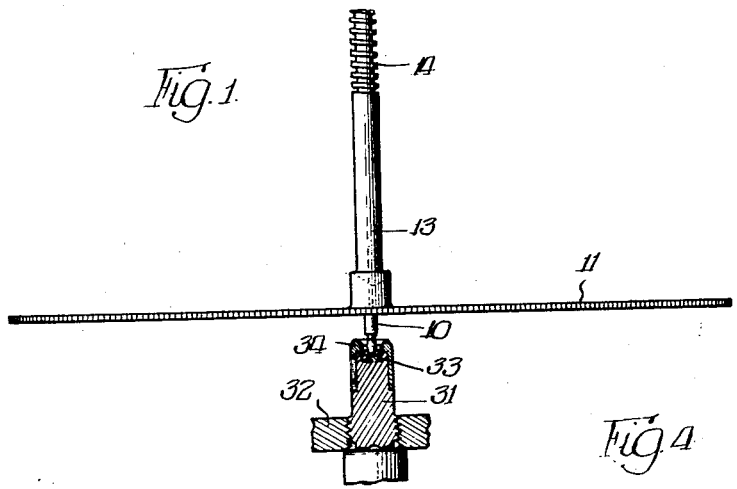
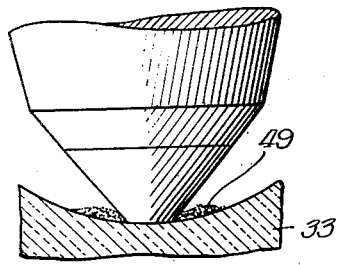
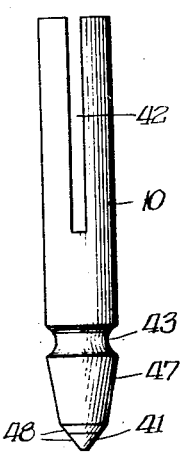
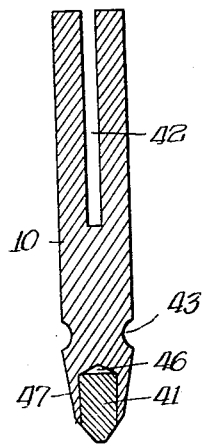
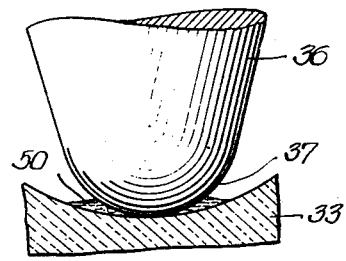
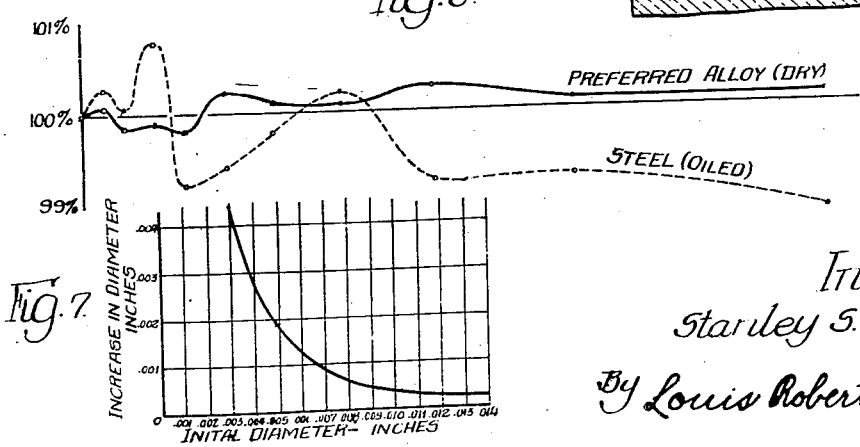
Inventor:
Stanley S. Green,
By Louis Robertson atty Patented June 4, 1940

2,203,411

UNITED STATES PATENT OFFICE 2,203,411

PIVOT FOR WATT-HOUR DISKS AND THE LIKE

Stanley S. Green, La Fayette, Ind., assignor to Duncan Electric Manufacturing Company, La Fayette, Ind., a corporation of Illinois Application March 1, 1937, Serial No. 128,346

13 Claims. (Cl. 308—159)

This invention relates to pivots and to the combination of such pivots and the bearings therefor. In some of its aspects it may relate to pivots in general, especially pivots on which there is a relatively light weight supported and therefore so little friction that lubrication is not essential for the immediate purpose of reducing friction. The invention is particularly valuable in rotatably supporting meter disks in watt-hour meters and the like, and its description will therefore be based on such use.

Watt-hour meters are precision instruments and in order to reduce the power required to start the meter disks for the measurement of very light loads it is necessary that the friction of the bearings for the disk be extremely low. It has long been the practice to provide the shaft carrying the disk with a pivot at its lower end which rotates on and is supported by a cupped jewel bearing. According to the most common practice the jewel has been a natural or synthetic sapphire or a diamond and the pivot has been a hardened carbon steel pivot having a spherically shaped bottom contact surface, the radius of which was smaller than the radius of the jewel so that the pivot should theoretically have a single point contact with the jewel. It has long been recognized that such pivots were not entirely satisfactory because they required oil to prevent rapid deterioration and it was not practical to provide oil which would last in good condition more than approximately three years. After the oil dried or seeped from the jewel the pivot and especially the metallic particles comprising the debris worn therefrom would oxidize. Such oxidized particles are very hard and act as effective abrasives between the pivot and its jewel bearing. This not only greatly increased the friction immediately by contact with the pivot, but furthermore caused a relatively rapid wear of both the pivot and the jewel, which is apt to become progressively worse.

The condition of the pivot determines the continued accuracy of the meter. Many public utility commissions have required the testing of meters every three years. Such frequent testing of the meters, however, represents a heavy expense to the utility companies, and it has sometimes been the practice to test the meters every five or even six years, at which time it has been necessary to take the meter cover off, remove the pivot from the shaft, replace it with a new pivot, clean and often replace the jewel. For a long time the utility companies have been dissatisfied with the pivots and have desired the meter manufacturing companies to find some way to improve them.

One of the very early attempts at improvement was a well known form of bearing in which a hardened steel ball is carried by the usual jewel bearing and rotatably supports an upper jewel bearing which is carried at the lower end of the disk shaft. In this form of bearing the ball would frequently change its position with the advantage that the wear on the ball would be relatively slight on any one spot, but with the disadvantage of slight variations of friction rendering the meter erratic, especially at light loads. However, if lubrication were not maintained, the ball would rust and the rust and other debris would collect and increase the friction and wear, or jam up the ball with respect to the jewels so that it would not function as a ball but merely as a fixed pivot.

Two recent attempts to solve the problem involved the use of different pivot materials. In one, a stainless steel shank is tipped with a non-ferrous alloy even harder than carbon steel. In the other, a shank is tipped with a tungsten-cobalt alloy, which is almost as hard as carbon steel. Both of these pivots have their tip formed with the old spherical shape with its minute contact area and both require lubrication to avoid oxidation and excessive wear of either the pivot or the jewel. It should be explained that although both of these materials might at first be thought to be non-oxidizing because they are regarded as stainless the truth is that they oxidize very readily. The oxide forms an extremely thin film which protects the metal against further oxidation. This film, however, is worn off by the rotation of the pivot, thus exposing more of the metal to oxidation.

Although either the ball type of bearing construction or the conventional bearing pivot construction gave fairly satisfactory performance for a reasonable time if adequate lubrication was maintained, the necessity for several or numerous lubrications or replacements during the life of a meter was extremely objectionable. Another disadvantage of prior bearing constructions has been the frequent breakage of the jewels, usually due to physical jolts of the meter in transportation but sometimes due to the jolts of the disk and shaft in service as a result of severe short circuits in the circuit being measured.

The present invention solves the long felt need for a satisfactory bearing construction by the simple and inexpensive expedient of a change in the pivot. Whereas the tendency heretofore has been to make the pivot as hard as possible, applicant has found that one important feature in the complete solution of the problem is the use of a softer metal, the metal now preferred having in the neighborhood of only half the hardness of the hardened carbon steel heretofore used. This apparently has the result of making the pivot more adaptable to the jewel and reducing the coefficient of friction.

According to another feature of the invention the collection of abrasive debris is prevented. To this end the pivot is made of a material which is absolutely immune to oxidation under any conditions the pivot is likely to meet. Oil is preferably eliminated, since applicant has found that oil increases the friction, in the absence of abrasive debris, and that with the preferred type of metal there is no abrasive debris formed even if oil is omitted.

Still another feature of the invention is in so shaping the pivot as to maintain the friction substantially uniform. Uniformity of friction is more important than a temporary minimizing of friction since if the meter were calibrated or adjusted for a temporary minimum of friction it would become too slow when the friction was no longer a minimum. Whereas an approximation of a point contact has heretofore been strived for and considered desirable, the present invention contemplates a contact area in the neighborhood of .008 inch diameter. With such a large initial area of contact the change of area due to wear or jolts is extremely small, especially if the sides of the pivot extent steeply from the contact area. Furthermore, the large area and the softer pivot metal substantially eliminate jewel breakage since the impact or pressure of the pivot is distributed over a relatively large area of the jewel and since the relatively soft metal yields sufficiently to have a slight cushioning effect and absorb the shock instead of transmitting it to the jewel.

The objects of the invention are for the most part obvious from the foregoing discussion, but in summary are to provide a satisfactory bearing construction for meter disks. In the more general aspects of the invention the objects are to provide improved bearings generally and particularly in devices where the friction is low enough to permit the use of an unlubricated bearing.

Further objects and advantages of the invention will be apparent from the following description and from the drawing, in which:

Fig. 1 is a fragmentary view partly in section and illustrating a meter disk employing one form of the present invention.

Fig. 2 is a greatly enlarged elevational view of a pivot constructed in accordance with this invention.

Fig. 3 is a longitudinal sectional view of the structure of Fig. 1.

Fig. 4 is a still further enlarged view showing the engagement between the pivot and the jewel bearing.

Fig. 5 is a similar view showing a conventional type of pivot used before applicant's invention.

Fig. 6 is a representative diagram showing the accuracy of registration of meters with two types of pivots, one with a conventional pilot (dotted line curve) and the other with a pivot of the present invention (solid line curve); and Fig. 7 is a diagram representing the amount of change of diameter of contact area to be expected with different diameters of initial pivot contact areas, the changes resulting from short circuit jolts of equal force.

Although this invention may take numerous forms, only the preferred form has been illustrated. In this form the pivot 10 which comprises the major feature of this invention has been illustrated in connection with a meter disk 11 carried by a shaft 13 in which the pivot 10 is inserted and which has worm threads 14, formed thereon near its upper end for driving a meter register. The disk is preferably positioned immediately above the pivot 10 with a relatively long portion of the shaft thereabove as in prior practice so that an infinitesimal force at the upper end of the shaft will be all that is required to keep the disk in a horizontal plane. This force may be provided in a substantially frictionless manner as illustrated in applicant's copending application Serial No. 48,713.

The lower bearing, exclusive of the pivot 10, is the same as has been used heretofore. A holder 31 screws through a bracket 32 and carries at its upper end a jewel bearing 33. A split sleeve 34 is preferably provided substantially as shown to guard the jewel bearing and to eliminate all chance that the pivot 10 will slip out of the cupped jewel bearing 33. The jewel 33 may desirably be a synthetic sapphire. From the standpoint of the pivot 10 all of the foregoing may be disregarded except in connection with such special problems as are presented by a meter disk and except of course that the pivot must rotate on some satisfactory bearing. Heretofore it has been the practice to make these pivots of a very hard material such as hardened carbon steel with the purpose of maintaining the low friction resulting from a small contact area, and it has been necessary to oil such pivots to prevent them from rapidly deteriorating due to oxidation and wear. The oil is not necessary, however, for reducing friction (until the pivot starts deteriorating) and in fact the total friction is so low that the surface tension of the added oil increases the friction. As previously stated, the necessity that the pivots be oiled has been very troublesome since the oil initially supplied cannot be expected to last more than about two or three years. The present invention overcomes this difficulty by forming the pivots according to an entirely different principle.

The hard material has been considered necessary in order to prevent deformation of the pivot by the exceedingly high contact pressure. It is obvious that even with the small weight of the disk the contact pressure (pounds per square inch) increases as the contact area decreases. In fact, if the contact area could be actually reduced to a geometric point the contact pressure would be infinite. With the most common type of prior art pivot 36, shown in Fig. 5, bearing on the same type of jewel bearing 33, there would theoretically be a point contact between the spherically shaped end portion 37 of the pivot and the bearing 33, the top surface of which has a larger radius of curvature. In practice, however, the point contact is never attained because the contact area is enlarged by distortion of the pivot. There would be some enlargement due to elasticity of the steel, but since this would still require the steel to withstand a pressure in the neighborhood of 90,000 to 125,000 pounds per square inch there would usually be further deformation even of the hardened steel used heretofore and after the deformation the pressure would still be high enough to cause rapid wear.

The hardened steel has the extreme disadvantage that its debris resulting from this inevitable wear is very abrasive, especially when the oil has dried or seeped out. According to the present invention applicant overcomes the excessive deformation and wear of the pivot, not by making the pivot still harder as would seem to be the obvious solution, but by making it of a relatively soft metal and preferably providing it with an initial contact area of such size that the change of contact area with wear is relatively small. There are various other requirements for these pivots if they are to thoroughly solve the problem, which may be listed as follows:

1. Both the pivot and any debris formed therefrom should be non-abrasive. The term "non-abrasive", as applied to the debris, means that it must have no appreciable and continuing abrasive effect either as to the jewel or as to the pivot. The above mentioned softness is one factor which contributes to making this feature possible. Others are mentioned below.

2. The pivot should be absolutely immune to oxidation even under the various severe conditions it is likely to encounter in service, and preferably even at considerably higher temperatures than it is likely to encounter to provide a safe leeway. One reason for having such a leeway in the form of "excess" resistance to oxidation is that continued rubbing of the molecules of pivot material under high pressure against the jewel material seems to greatly aggravate susceptibility of the pivot material to oxidation, especially in the presence of minute quantities of moisture such as are contained in ordinary air. The chief need for immunity to oxidation is to prevent the formation of abrasive debris, since the oxides of metals otherwise suitable for pivots are ordinarily abrasive. This feature, together with the softness or non-abrasiveness of the pivot material, make oil unnecessary for preservation and, since it was unnecessary anyway to reduce friction, it may now be omitted.

3. In order that the pivot may be satisfactory in all circumstances, it must be absolutely non-corrosive in any atmosphere which the meter is designed to withstand, including acid atmospheres. The reasons for this requirement are the same as those stated above.

4. To aid in the elimination of jewel breakage the pivot should be sufficiently soft to protect the jewels from the jolts commonly received. Elasticity helps in this connection, as does the large contact area required by a soft metal. Of course, sufficient softness to avoid abrasiveness is also required as indicated by paragraph 1.

5. The pivot should be sufficiently hard so that with a given size of initial contact area the contact area will not be unduly enlarged by physical blows as when the meter is jolted in transit or when the shaft is jolted as the result of a short circuit in the circuit being measured by the meter. The shape of the pivot has a great deal to do with the amount of enlargement of the contact area from a given jolt or from wear and is discussed more fully below. The maximum hardness which can be obtained without causing excessive breakage of jewels or unduly increasing the friction seems to be desirable. It is obvious that this may necessitate a compromise between the desirability of hardness and the desirability of softness.

6. High resistance to wear is obviously desirable and necessary for long pivot life.

7. The pivot should be formed of a material having a relatively low coefficient of friction with the bearing, and of course to reduce the friction the contact surface should be polished. This requirement is obviously related to the requirement for non-abrasiveness.

8. It is believed to be very desirable and possibly essential that the pivot material be highly ductile and malleable, though this desirability is for the sake of making the foregoing requirements possible rather than being ends in themselves. In any event, the highly malleable materials, especially gold, seem to be the materials most likely to have the other characteristics required. If the metal is sufficiently malleable it is conceivable that any malleable metallic (non-oxidized) debris which finds its way under the contact surface is wiped smoothly over the contact surface in a film and ceases to be debris. Since the metallic debris worn from a pivot is naturally as hard as the pivot it seems probable that malleability is necessary to render this debris completely non-abrasive as to the pivot. Furthermore, the malleability and ductility may contribute to the low coefficient of friction by enabling the particles to be spread smoothly over the entire contact area in polishing the pivot, thus forming what might be termed a "slick" surface. With non-malleable materials such as the old hardened steel the polishing action seems to be more in the nature of smoothing down or wearing off the various crystals to a uniform level but leaving infinitesimal interstices between them. The high ductility is also advantageous in facilitating manufacture of the pivots by drawing the metal into wire. This also is advantageous since the drawing of the metal tends to increase its tensile strength, the desirability of which is mentioned above.

Although the preferred form of pivot includes all of the above requirements, it is obvious that a pivot could be provided from which one or more of the requirements are lacking, thus obtaining some of the advantages of this invention although not making full use of the invention. Likewise it should be noted that the foregoing requirements are really requirements for the contact portion of the pivot rather than being requirements for the entire pivot. For various reasons, including the cost of the alloy which best provides these requirements, it is desired to make the pivot in two parts, as seen best in Fig. 3. The shank portion, to which the reference numeral 10 has been applied, may be made of one material and the tip portion 41 may be made of another material. Of course, the tip portion 41 could be called the pivot and the portion 10 could be called the pivot holder. The holder portion 10 need not be malleable or soft, but it is desirable that it be non-corrosive and non-oxidizing (except for a permanent protective oxide film) to prevent rust from falling onto the bearing, and it is obvious that it should have adequate strength. It may desirably be made of any of the stainless steels now well known, though of course it could be made of other strong stainless alloys, such as "Duralumin". It is preferably split by a slot 42 at its upper end so that it may fit more readily into a variety of meter disk shafts or, in other words, accommodate itself to the irregularities of the bores which are provided in such shafts for the insertion of the pivots therein. The pivot is also provided with an annular recess 43 for engagement by a tool in inserting the pivots into the shaft and pulling them out therefrom.

The chemical composition of the pivot point 41 is entirely unimportant except insofar as it provides the characteristics set forth above which are physical except for the property of not oxidizing or corroding: In fact, immunity to corrosion in service, resistance to wear, and a low coefficient of friction with the jewel or other bearing member seem to be the only absolute requirements. Any pivot point composition which provides these characteristics, or any of the characteristics which is new, may therefore be considered as within the teachings of this invention. The preferred compositions are not new, although their use as pivots is new. To enable those skilled in the art to practice this invention the following examples of suitable materials are set forth, the first of these examples being the best material which has so far been discovered.

*Composition in percent by weight*

| Alloy | Gold Au | Platinum Pt | Palladium Pd | Silver Ag | Copper Cu | Zinc Zn | Brinell hardness |
|---|---|---|---|---|---|---|---|
| A | 72.0 | 8.5 | 0 | 4.0 | 14.5 | 1.0 | 280 |
| B | 55.0 | 18.0 | 7.5 | 7.0 | 11.0 | 1.5 | 295 |
| C | 10.0 | 10.0 | 35.0 | 30.0 | 14.0 | 1.0 | 290 |
| D | 15.0 | 1.0 | 23.0 | 40.0 | 20.0 | 1.0 | 225 |

The hardness given for each alloy is that found by a test on a "baby" Brinell machine, $\tfrac{1}{16}$ inch ball, 12.8 kg. weight. Although those skilled in the art would probably know suitable heat treatments to provide the hardness stated in each instance, the following heat treatments may be set forth. Composition "A" is held at a temperature of 900° F. for two minutes and cooled in the furnace through thirty minutes to 450° F., after which it is quenched. Composition "B" is held at a temperature of 900° F. for ten minutes and subsequently treated the same as composition "A." Composition "C" is held at a temperature of 1050° F. for two minutes, cooled in the furnace to 500° F. and quenched. Composition "D" is given the same heat treatment as composition "C." Different heat treatments may be able to make some of these materials harder, but since the first of these alloys has been found to be the best, it is believed that a hardness as low as 280 Brinell is desirable. Even this is a fairly hard metal, being used for dental bridge clamps. Any appreciable reduction in hardness from the hardness of the tungsten-cobalt and hardened steel pivots (about 650 Brinell) of the past seems beneficial.

Although gold seems to be the most satisfactory major ingredient, platinum, palladium, other members of their group and any other metal which will not corrode and form an abrasive material under service conditions may be substituted for gold, provided that it may be sufficiently hardened to maintain a contact surface of reasonably uniform and low friction torque. Any hardening materials may be used which leave these properties unimpaired.

In forming the pivots a suitable length of wire drawn from the desired material and then heat treated may be inserted into a socket 46 in a suitable rod from which the body portion 40 is to be formed and may be swaged into place. The swaging operation may shape the pivot point to the approximate desired shape, or the point and the body portion may subsequently be formed together to the illustrated shape. As a final step the point may be burnished to the desired final shape and the entire lower portion of the pivot may be polished. Of course, the tip could be applied to the shank in a different manner, as by welding, in which case the shank and tip could be heat treated together after the welding process.

*Shape of the pivot*

A relatively soft and definitely inoxidizable metal for a pivot requires a suitable shaping of the pivot point to successfully capitalize on these unique natural properties. This new shape is a radical departure from all precedent in pivot shapes and is an important aspect of the invention. In fact, experiments with platinum and platinum alloy pivots reported some years ago have apparently been abandoned, and the lack of a satisfactory shape may have been one reason for this.

The preferred shape of the pivot is adequately illustrated in Figs. 2 and 3. The portion 47 of the pivot below the annular recess 43 may be slightly tapered for the sake of appearance, perhaps about 10° from the axis. The portion of the pivot body and the insert therein down to the contact surface are preferably tapered, as shown at 48, at the steepest angle which is believed to provide adequate strength for the insert, the reasons for a steep angle being described below. At the present time applicant prefers a taper of about 40° from the axis.

The tip of the pivot is shaped to fit the jewel as nearly as possible. As a matter of practice it is preferred that any imperfection in fit be in the direction of flatness so that if the pivot does not contact the jewel over the full intended contact area it will contact it at the periphery thereof instead of at a single point at the center. The chief advantage of this is that there will be less change in the total friction as the pivot wears sufficiently to fit the jewel perfectly and that change will be in the direction of less friction because the average lever arm of the friction torque will be shortened toward the center of rotation as the wear progresses.

One advantage of a steep wall at the portion 48 is that the change of contact diameter as a result of wear is low. Another is clearly seen from a comparison of Figs. 4 and 5. In Fig. 4 it is seen that a hypothetical accumulation of debris 49 (probably much more than would ever appear with the pivot of this invention) has relatively little contact with the pivot so that the friction of the pivot with the debris is very low. Furthermore, the torque arm of this friction, i. e., the distance of the point of contact from the rotational axis, is only slightly greater than the maximum torque arm of the contact surface of the pivot on the bearing. In Fig. 5, however, a substantially equal amount of foreign matter 50, which in this case may be dust or oxide which has become intermingled with the oil initially supplied, will have a relatively large area of contact with the pivot, and due to the acute clearance angle between pivot and jewel surfaces the torque arm of the added friction due to the oil or debris is a great deal longer than the torque arm of the pivot surface contacting the jewel. In fact, due to the acute angle the debris can wedge under the pivot and help to carry the weight of the moving element and thus produce friction at the end of a relatively long lever arm where it is most harmful. Furthermore, it is probable that a pivot with the shape of Fig. 4 will push the debris aside whereas a pivot of the old shape shown in Fig. 5 will be unable to keep the debris from getting under the contact surface.

The contact area which should be initially provided at the bottom of the pivot point varies with different materials which are used and it must be determined by balancing two opposing considerations. It is desirable to have the contact diameter large enough so that the percentage of change as a result of wear or jolts will be slight; but a small diameter is desired for reducing the torque arm. The increase of friction torque which accompanies an increase of diameter is merely due to an increase in the average torque arm since the absolute friction remains constant, being the product of weight and coefficient of friction. The percentage of increase of friction torque is theoretically about ⅔ of the percentage of increase of contact diameter, but applicant has discovered that the increase is actually considerably less than this. Possibly the extremely high pressures on the old small contacts which compressed the metal almost to its elastic limit raises its coefficient of friction. Another explanation may be that since the increased diameter is caused by additional polishing, the consequent increase in diameter is more than compensated for by the reduction in coefficient of friction.

The amount of increase of contact diameter with a pivot of the shape shown and of the composition "A", given above, for different initial sizes of contact diameter is shown by the curve of Fig. 7. From this curve it is seen that with the contact diameter less than .005 or .006 inch the increase of contact area after a jolt is relatively great, while with an initial diameter as great as approximately .009 or .010 inch the change of area is insignificant, it being assumed in all instances that the cause of a change of area is equal, such cause being the average jolt given to a disk by an extremely heavy short circuit. It would seem therefore that from this consideration a diameter greater than .010 inch should be used. However, this increases the diameter of the contact surface to an extent undesirable from the standpoint of friction torque, especially since any change in the condition of the contact surface at the periphery thereof could have a relatively great effect in changing the friction torque. Accordingly, it is at present preferred to compromise the two considerations and use a contact diameter with the preferred composition "A", of .008 inch, a tolerance of .002 inch in either direction being allowed. If the surface is flat so that it must reshape itself to the jewel, its initial contact diameter should be smaller, even as small as .003 inch having been found satisfactory. The contact area should be increased or decreased with softer or harder metals. The area could vary inversely in proportion to the hardness, but tests may show that a different compromise is better.

The effectiveness with which this invention solves the problems of meter bearings is shown by Fig. 6, in which the solid line curve indicates the average accuracy of two test meters provided with pivots such as that illustrated in Fig. 3 and using composition "A", and the dotted line is a typical accuracy curve for a similar meter using the conventional prior art pivot of Fig. 5. Both curves represent about three years average domestic service and start with 100% registration signifying accurate initial adjustment of each meter. The old steel pivot varied in friction so much that the registration varied almost 1% in each direction and at the end of the test was even worse and was going down, showing that this pivot had not yet reached a stable condition. The new pivot was so constant that the accuracy was never more than approximately ⅓ of 1% off, and at the end of service corresponding to about two years of domestic use was well broken in and remained constant at almost exact accuracy. The test was not run for sufficient time to affect the oil applied to the steel pivot and it was still in good condition, or the results with that pivot would have been much worse than they were.

One advantage which the chart does not show is that the relatively soft pivot of the present invention with its large contact area practically never breaks the jewel, while the jewels are often broken by impacts of the hard steel pivots against minute areas thereof. The preferred metal is sufficiently soft so that even with an area as low as .0025 breakage of the jewel is unlikely. The tip merely mushrooms with little damage except as to appearance.

The curves also fail to show the initial friction torque since they merely show the constancy of friction torque. The coefficient of friction of polished alloy "A" on sapphire is so low that in spite of the large contact diameter of the preferred form of pivot, its friction torque is only about 15% higher when dry than is that of the steel pivot when oiled and new.

On a severe accelerated test of the preferred pivots, the amount of wear after even 100 million revolutions, running dry, has been found to be exceedingly minute—not to exceed about .001 inch, or enough to increase the pivot contact point from .008 inch to not over .010. One hundred million revolutions corresponds to approximately twenty-five years of normal meter service.

Of course, much of the advantage of the new pivot alloys could be obtained even though the old shape were used. Likewise, some advantages could be obtained by forming pivots of the old metals in the new shape, though of course oil would have to be used as before, and with its attendant disadvantages, to prevent oxidation.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. A bearing construction for a watt-hour meter disk including a bearing jewel and a pivot member formed of malleable metal of a hardness less than 500 Brinell and which does not oxidize under operating conditions, said pivot being preformed with the curvature of a substantial area of contact surface approximately that of the curvature of said jewel.

2. A bearing construction for a watt-hour meter disk including an open bearing jewel and a pivot member formed of malleable metal of a hardness less than 500 Brinell and which does not oxidize under operating conditions, said pivot being preformed with the curvature of a substantial area of contact surface approximately that of the curvature of said jewel and with its sides extending steeply away from said surface and providing a wide angle of clearance between such sides and the jewel.

3. A bearing construction for a watt-hour meter disk including a bearing jewel and a pivot member formed of malleable metal of a hardness less than 500 Brinell and which does not oxidize under operating conditions, said pivot being preformed with the curvature of a substantial area of contact surface approximately that of the curvature of said jewel, the contact diameter being approximately from .005 to .010 inch.

4. The combination of an open cup bearing and a pivot having a preformed contact surface with a radius of curvature at least approximately as large as that of the cup bearing and having its sides extending steeply away from said surface and forming an angle therewith, and providing a generous open clearance space between the sides of the pivot and the cup.

5. A pivot type bearing subject to mechanical shocks in service, consisting of a pair of members in rotatable supporting relation, one of the members being a pivot member and the other being a complementary member of hard material, said pivot member having a contact surface for rotatably engaging the complementary member which is preformed to approximately the radius of curvature of the engaged portion of the complementary member, consisting of a metal softer than 500 Brinell and having its contact surface of such area that in spite of the softness of the material it will withstand said shocks without undue deformation, said complementary member being sufficiently hard to resist deformation from said shocks and to be substantially free from wear by said pivot, and the pivot being formed predominantly of gold and metal from the platinum group, being in a metallic state, and being substantially noncorrodible under oil-free running conditions of the bearing.

6. A pivot type bearing subject to mechanical shocks in service, consisting of a pair of members in rotatable supporting relation, one of the members being a pivot member and the other being a complementary member of hard material, said pivot member having a contact surface for rotatably engaging the complementary member which is preformed to approximately the radius of curvature of the engaged portion of the complementary member, having its sides extending steeply away from the complementary member to provide a generous open clearance space for debris and consisting of a metal softer than 500 Brinell and having its contact surface of such area that in spite of the softness of the material it will withstand said shocks without undue deformation, said complementary member being sufficiently hard to resist deformation from said shocks and to be substantially free from wear by said pivot, and the pivot being in a metallic state, and being substantially noncorrodible under oil-free running conditions of the bearing.

7. A pivot type bearing subject to mechanical shocks in service, consisting of a pair of members in rotatable supporting relation, one of the members being a pivot member and the other being a complementary member of hard material, said pivot member having a contact surface for rotatably engaging the complementary member which is pre-formed to approximately the radius of curvature of the engaged portion of the complementary member, consisting of a metal softer than 500 Brinell and having its contact surface of such area that in spite of the softness of the material it will withstand said shocks without undue deformation, said complementary member being sufficiently hard to resist deformation from said shocks and to be substantially free from wear by said pivot, and the pivot being in a metallic state, and being substantially noncorrodible under oil-free running conditions of the bearing.

8. A pivot formed predominantly of gold and including a substantial proportion of metal from the platinum group and approximately 1% zinc, the balance being substantially all silver and copper in quantities insufficient to render the alloy oxidizable except at high temperatures.

9. An oil free bearing construction including a bearing jewel and a pivot member formed of metal having a hardness between approximately 225 Brinell and 500 Brinell and which does not oxidize under oil free operating conditions, said metal being of a composition comprising at least approximately 50% of the group consisting of gold, platinum and palladium, substantially all of the balance being metal which alloys therewith and which does not oxidize more readily than copper.

10. An oil free bearing construction including a bearing jewel and a pivot member formed of metal having a hardness between approximately 225 Brinell and 500 Brinell and which does not oxidize under oil free operating conditions, said metal being of a composition comprising at least approximately 50% of the group consisting of gold and the platinum group, substantially all of the balance being metal which alloys therewith and which does not oxidize more readily than copper.

11. A bearing construction for a watt-hour meter disk including a pair of members in rotating supporting relation, one of the members being a pivot member and the other being a complementary member of hard material, said pivot member having a contact surface for rotatably engaging the complementary member which is preformed to approximately the radius of curvature of the engaged portion of the complementary member, having a diameter of approximately at least .0025 inch and consisting of a metal of a hardness between approximately 225 Brinell and 500 Brinell, said complementary member being sufficiently hard to resist deformation from shocks delivered by said pivot and to be substantially free from wear by said pivot even after long service.

12. A bearing construction for a watt-hour meter disk including a pair of members in rotating supporting relation, one of the members being a pivot member and the other being a complementary member of hard material, said pivot member having a contact surface for rotatably engaging the complementary member which is formed of a malleable metal which does not oxidize under oil free conditions of service, having a hardness between approximately 225 Brinell and 500 Brinell and from which any debris formed in service is of no greater hardness; said complementary member being sufficiently hard to resist deformation from shocks delivered by said pivot and to be substantially free from wear by said pivot even after long service.

13. The combination of an open cup bearing and a pivot formed of a metal having a hardness between approximately 225 Brinell and 500 Brinell, having a preformed contact surface with a radius of curvature at least approximately as large as that of the cup bearing and having its sides extending steeply away from said surface and forming an angle therewith, and providing a generous open clearance space between the sides of the pivot and the cup.

STANLEY S. GREEN.